United States Patent
Kurimoto et al.

(10) Patent No.: US 10,605,141 B2
(45) Date of Patent: Mar. 31, 2020

(54) HONEYCOMB STRUCTURE

(71) Applicant: NGK Insulators, Ltd., Nagoya (JP)

(72) Inventors: Yudai Kurimoto, Nagoya (JP); Shogo Hirose, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/291,422

(22) Filed: Mar. 4, 2019

(65) Prior Publication Data
US 2019/0301335 A1    Oct. 3, 2019

(30) Foreign Application Priority Data

Mar. 28, 2018  (JP) ................. 2018-062667

(51) Int. Cl.
*F01N 3/28* (2006.01)
*B01J 35/04* (2006.01)
*B01J 35/10* (2006.01)

(52) U.S. Cl.
CPC ............ *F01N 3/2842* (2013.01); *B01J 35/04* (2013.01); *B01J 35/10* (2013.01); *F01N 2330/38* (2013.01); *F01N 2330/48* (2013.01)

(58) Field of Classification Search
CPC ............... F01N 2330/48; F01N 3/2842; F01N 2330/38; B01J 35/04; B01J 35/10
USPC ..................... 422/180; 55/523; 428/116
See application file for complete search history.

(56) References Cited

U.S. PATENT DOCUMENTS

2009/0176053 A1*  7/2009  Miyairi .............. B01D 46/0001
                                                        428/116
2013/0059724 A1    3/2013  Hirose et al.

FOREIGN PATENT DOCUMENTS

JP           2013-052367 A1    3/2013

* cited by examiner

*Primary Examiner* — Tom P Duong
(74) *Attorney, Agent, or Firm* — Burr & Brown, PLLC (57) ABSTRACT

A honeycomb structure includes a porous partition wall disposed so as to surround cells extending from a first end face to a second end face. The cells include partially clogged cells which account for 10 to 80% of the total number of the cells, and each of which includes a protrusion that protrudes inward from the surface of the partition wall. The protrusion is partially formed in a direction in which each partially clogged cell extends. In a projected view from the first end face to the second end face, a ratio of area of the protrusion in each partially clogged cell to whole area of the through channel of each partially clogged cell is 5 to 80%, the whole area including the protrusion, and the partition wall surrounding each partially clogged cell has a thickness at a thinnest part of 0.038 mm or more.

8 Claims, 3 Drawing Sheets

HONEYCOMB STRUCTURE

The present application is an application based on JP 2018-062667 filed on Mar. 28, 2018 with Japan Patent Office, the entire contents of which are incorporated herein by reference.

BACKGROUND OF THE INVENTION

Field of the Invention

The present invention relates to honeycomb structures. More specifically the present invention relates to a honeycomb structure capable of improving the purifying performance while suppressing deterioration of the strength.

Description of the Related Art

Developed countries are examining to tighten the standards on NOx emission from diesel-fueled vehicles and tracks more. To meet such NOx emission standards, various techniques have been proposed to treat NOx in exhaust gas. One of these techniques is, for example, loading a honeycomb structure having a porous partition wall with Selective Catalytic Reduction catalyst (hereinafter this may be called "SCR catalyst"), for example, and treats NOx in exhaust gas for purification with the honeycomb structure (see Patent Literature 1).

[Patent Document 1] JP-A-2013-052367

SUMMARY OF THE INVENTION

In the above NOx treatment by the honeycomb structure, it is possible to improve the ability to purify the exhaust gas by loading the honeycomb structure with an increased amount of catalyst. Meanwhile, when a honeycomb structure loaded with catalyst is installed in the exhaust system of a diesel-fueled vehicle, for example, for NOx treatment, this may cause a problem of an increase of pressure loss in the honeycomb structure. Such an increase of pressure loss in the honeycomb structure may reduce the output from the engine or degrade the fuel consumption.

As another method to improve the purifying performance, the cell density of a honeycomb structure may increase so as to increase the ratio of contact of catalyst with exhaust gas. Such an increase of cell density of the honeycomb structure, however, may lead to the problem of an increase of pressure loss in the honeycomb structure.

In order to improve the temperature-rising property and the loading amount of catalyst of the honeycomb structure, a technique of increasing the porosity of the partition wall of the honeycomb structure also has been proposed. Such a honeycomb structure with increased porosity of the partition wall is intended to suppress an increase of the pressure loss while increasing the amount of catalyst for loading, for example. Such a honeycomb structure with increased porosity of the partition wall, however, has reduced mechanical strength of the honeycomb structure. In this way, there is a limit to increase the porosity of the partition wall, and the current techniques have a difficulty to improve the purifying performance more.

In view of such problems of the conventional techniques, the present invention provides a honeycomb structure capable of improving the purifying performance while keeping the cell density of the honeycomb structure without increasing it and suppressing deterioration of the strength.

The present invention provides the following honeycomb structure.

According to a first aspect of the present invention, a honeycomb structure is provided including: a pillar-shaped honeycomb structure body having a first end face and a second end face and including a porous partition wall disposed so as to surround a plurality of cells, the plurality of cells extending from the first end face to the second end face and serving as a through channel of fluid, wherein the plurality of cells include partially clogged cells that account for 10 to 80% of the total number of the plurality of cells, each of the partially clogged cells including a protrusion that protrudes inward of each of the partial clogged cells from the surface of the partition wall that surrounds each of the partially clogged cells, the protrusion in each of the partially clogged cells is partially formed in a direction in which each of the partially clogged cells extends, in a projected view from the first end face to the second end face of the honeycomb structure body, a ratio of area of the protrusion in each of the partially clogged cells to whole area of the through channel of each of the partially clogged cells is 5 to 80%, the whole area including the protrusion, and the partition wall surrounding each of the partially clogged cells has a thickness at a thinnest part of 0.038 mm or more.

According to a second aspect of the present invention the honeycomb structure according to the first aspect is provided, wherein the partition wall has a thickness of 0.038 to 0.229 mm.

According to a third aspect of the present invention, the honeycomb structure according to the first or second aspects is provided, wherein the protrusion has a length in a direction extending from the first end face to the second end face that is 0.21 to 1.36 mm.

According to a fourth aspect of the present invention, the honeycomb structure according to any one of the first to third aspects is provided, wherein the honeycomb structure body has cell density of 31 to 140 cells/cm$^2$.

According to a fifth aspect of the present invention, the honeycomb structure according to any one of the first to fourth aspects is provided, wherein the partition wall surrounding each of the partially clogged cells has a dent around the protrusion, the dent being an inwardly depressed part of the partition wall.

Advantageously the honeycomb structure of the present invention can be favorably used as a catalyst carrier to be loaded with catalyst for purifying of exhaust gas and can improve the purifying performance while suppressing deterioration of the strength. Specifically the plurality of cells surrounded by the porous partition wall include partially clogged cells, and each of the partially clogged cells includes a protrusion that protrudes inward of each of the partially clogged cells from the surface of the partition wall that surrounds each of the partially clogged cells. When exhaust gas passes through the clogged part of each cell having the protrusion, this part can promote diffusion of the exhaust gas and can improve the purifying performance. The protrusion also can increase the contact area between the catalyst on the surface of the partition wall and the exhaust gas, and so can improve the purifying performance. The ratio of number of the partially clogged cells to the total number of cells and the area ratio of the protrusion in each of the partially clogged cells may be set within predetermined numerical ranges, whereby the purifying performance as stated above can improve while effectively suppressing deterioration of the strength.

DESCRIPTION OF THE PREFERRED EMBODIMENTS

The following describes embodiments of the present invention, and the present invention is not limited to the following embodiments. The present invention is to be understood to include the following embodiments, to which modifications and improvements are added as needed based on the ordinary knowledge of a person skilled in the art without departing from the scope of the present invention.

Figure 1:
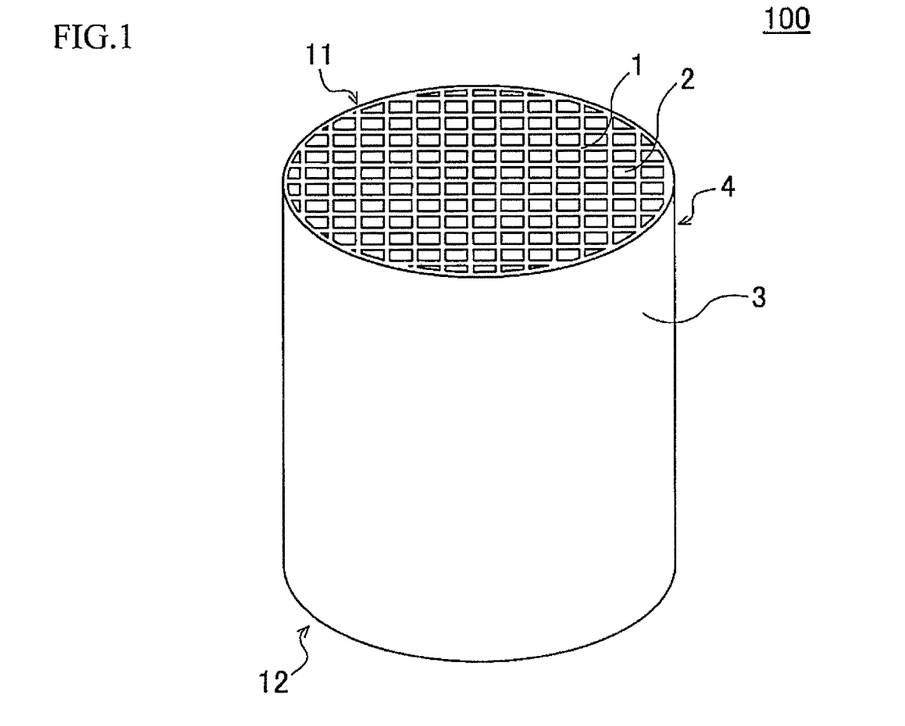
FIG. 1 is a perspective view schematically showing one embodiment of the honeycomb structure of the present invention.
Figure 2:
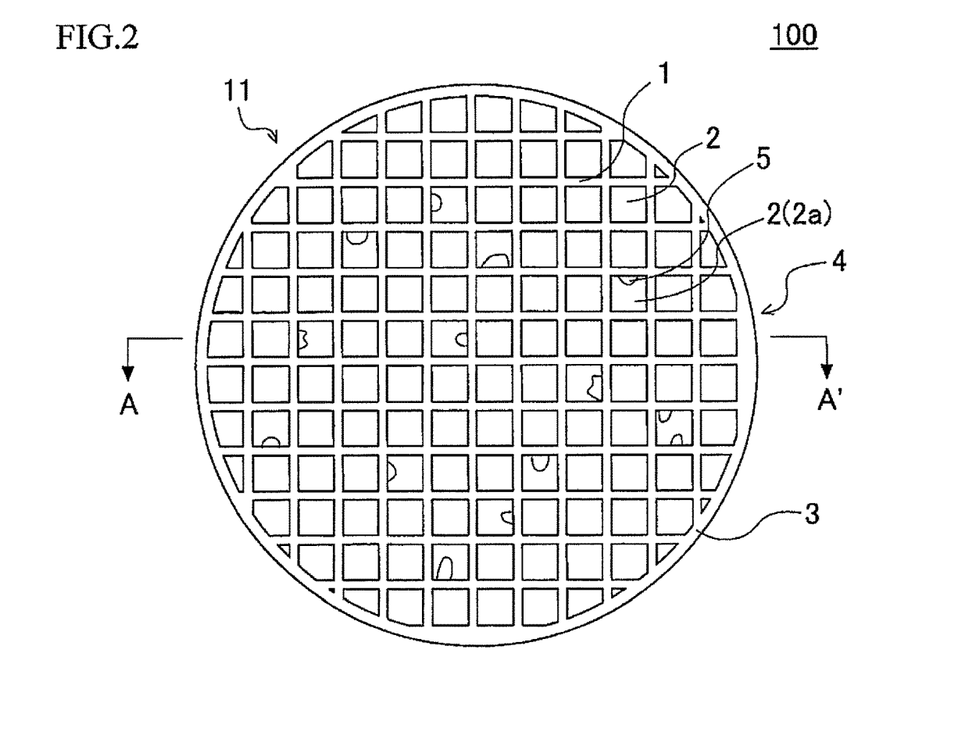
FIG. 2 is a plan view showing the first end face of the honeycomb structure of FIG. 1.
Figure 3:
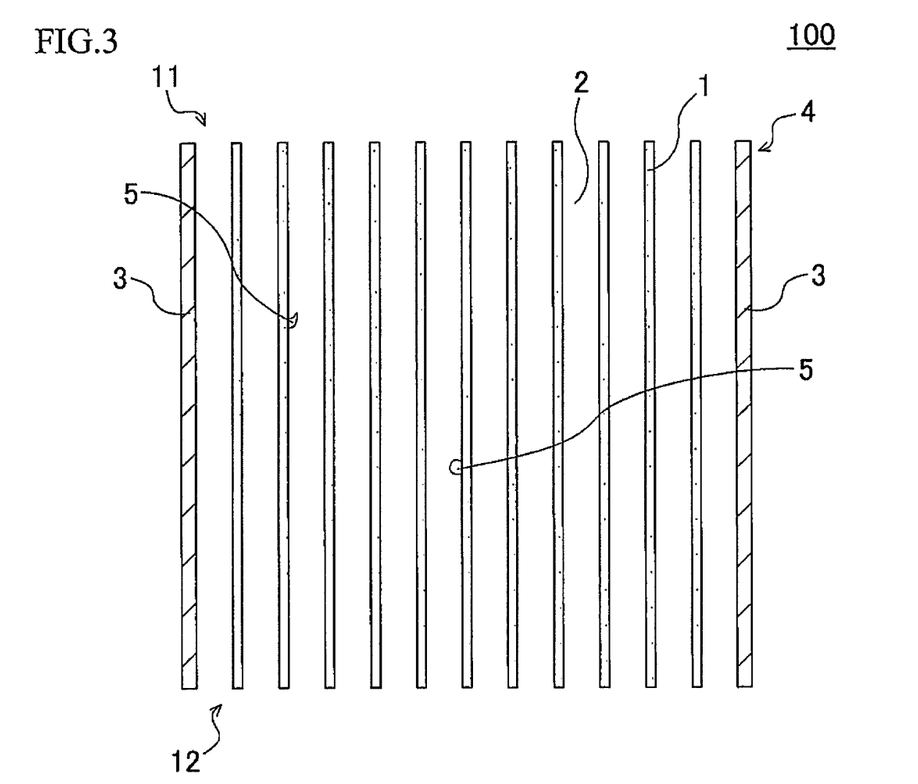
FIG. 3 is a schematic cross-sectional view taken along the line A-A' of FIG. 2.

(1) Honeycomb Structure:

A first embodiment of the honeycomb structure of the present invention is a honeycomb structure 100 as shown in FIGS. 1 to 3. FIG. 1 is a perspective view schematically showing one embodiment of the honeycomb structure of the present invention. FIG. 2 is a plan view showing the first end face of the honeycomb structure of FIG. 1. FIG. 3 is a schematic cross-sectional view taken along the line A-A' of FIG. 2.

As shown in FIGS. 1 to 3, the honeycomb structure 100 of the present embodiment includes a pillar-shaped honeycomb structure body 4 having a first end face 11 and a second end face 12. The honeycomb structure body 4 has a porous partition wall 1 that surrounds a plurality of cells 2, and each of the plurality of cells extends from the first end face 11 to the second end face 12 of the honeycomb structure body and serves as a through channel of fluid. In the honeycomb structure 100 of the present embodiment, the honeycomb structure body 4 has a round pillar shape, and further includes a circumferential wall 3 at the outer circumferential face. That is, the circumferential wall 3 surrounds the grid-patterned partition wall 1. In the present invention, cells 2 refer to a space surrounded by the partition wall 1.

Figure 4:
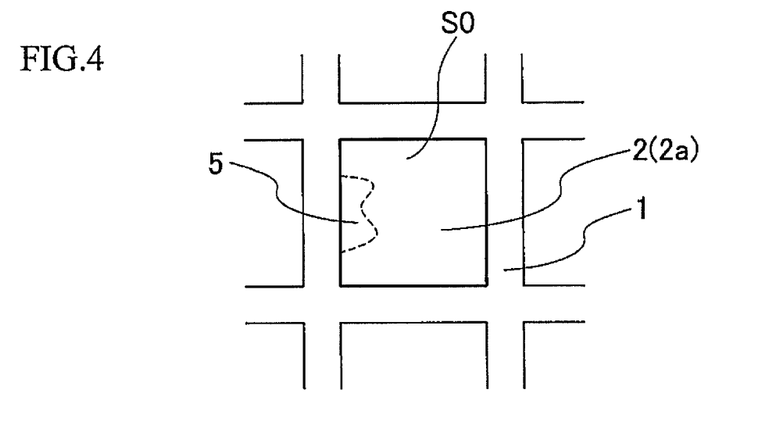
FIG. 4 is an enlarged plan view of a part of FIG. 2 to explain the area of through channels of the cells.
Figure 5:
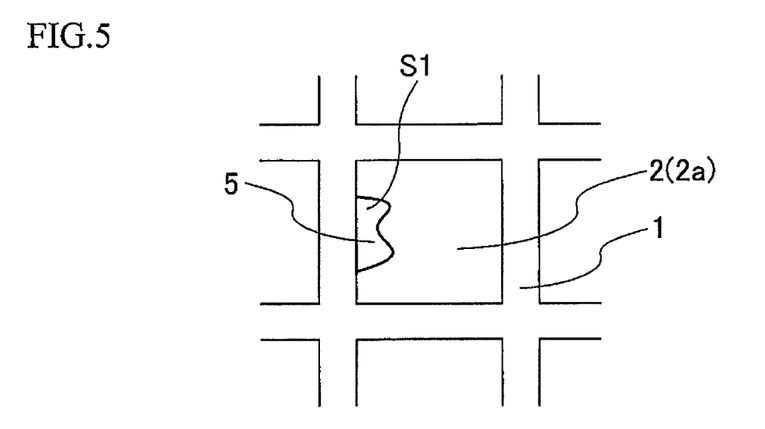
FIG. 5 is an enlarged plan view of a part of FIG. 2 to explain the area occupied by protrusions.

The plurality of cells 2 includes partially clogged cells 2a accounting for 10 to 80% of the total numbers of the cells 2, and the partially clogged cells 2a are configured as follows. A partially clogged cell 2a refers to the cell 2 including a protrusion 5 that protrudes inward of the partial clogged cell 2a from the surface of the partition wall 1 that surrounds this partially clogged cell 2a. Note here that this protrusion 5 in the partially clogged cell 2a is partially formed in a direction in which this partially clogged cell 2a extends. In a projected view from the first end face 11 to the second end face 12 of the honeycomb structure body 4, a ratio of area S1 of the protrusion 5 in each partially clogged cell 2a to area S0 of the through channel of the partially clogged cell 2a is 5 to 80%, the area S0 including the protrusion 5 (see FIG. 4 and FIG. 5, for example). As shown in FIG. 4, the area S0 of the through channel of the partially clogged cell 2a including the protrusion 5 means whole area of the through channel of the partially clogged cell 2a in the projected view as stated above. In a projected view of one partially clogged cell 2a, when the partially clogged cell 2a has two or more protrusions 5, area S1 occupied by the protrusions 5 is the sum of area of those protrusions 5. Hereinafter the ratio of area S1 of the protrusion(s) 5 to the area S0 of the through channel of the partially clogged cell 2a, the area S0 including the protrusion(s) 5, may be simply called an "area ratio of the protrusion(s) 5".

The area S0 of the through channel of a partially clogged cell 2a, the area S0 including the protrusion(s) 5, and the area S1 of the protrusion(s) 5 can be measured by taking images of the end face and a cross section of the honeycomb structure 100 and analyzing the taken images. For instance, the area S1 of the protrusion(s) 5 can be measured by the following method. Firstly, the honeycomb structure 100 is irradiated with light from one end face (e.g., from the first end face 11) to check whether each cell 2 of the honeycomb structure 100 includes protrusions 5 or not. When the checking shows that any cell 2 includes a protrusion 5, then the honeycomb structure 100 is cut along the plane orthogonal to the extending direction of the cells 2 at a position of the protrusion 5. Next, an image of the cells 2 in the cut plane of the honeycomb structure 100 is taken by a digital microscope (product name) produced by Keyence Corporation, for example, and the image is analyzed to obtain the area S1 of the protrusion 5 in the partially clogged cell 2a. In this image, the substantial area of through channel of the partially clogged cell 2a is obtained, and the obtained area is added to the area S1 of the protrusion 5 to obtain the area S0 of the through channel of the partially clogged cell 2a, the area S0 including the protrusion 5.

The honeycomb structure 100 of the present embodiment has the ratio of the number of the thus configured partially clogged cells 2a to the total numbers of cells 2 that is 10 to 80%. Note here that the honeycomb structure body 4 has incomplete-shaped cells 2 at the outermost circumference that are surrounded by the partition wall 1 and the circumferential wall 3. For the measurement of the total number of the cells 2 and the number of the partially clogged cells 2a, the number of such incomplete-shaped cells 2 at the outermost circumference is not counted. Hereinafter the ratio of the number of partially clogged cells 2a to the total number of cells 2 may be simply called a "ratio of number of the partially clogged cells 2a".

In the honeycomb structure 100 of the present embodiment, the partition wall 1 surrounding the partially clogged cells 2a has a thickness at the thinnest part of 0.038 mm or more. That is, a partially clogged cell 2a is continuously surrounded by the porous partition wall 1 over the entire area from the first end face 11 to the second end face 12 of the honeycomb structure body 4 so as to define a space as the thorough channel of fluid.

Advantageously the honeycomb structure 100 of the present embodiment can be favorably used as a catalyst carrier to be loaded with catalyst for purifying of exhaust gas and can improve the purifying performance. Specifically a plurality of cells 2 surrounded by the porous partition wall 1 includes the partially clogged cells 2a as stated above. When exhaust gas passes through the clogged part of the partially clogged cells 2a having protrusions 5, this part can promote diffusion of the exhaust gas and can improve the purifying performance. The protrusions 5 can increase the contact area between the catalyst on the surface of the partition wall 1 and the exhaust gas, and so can improve the purifying performance. The ratio of number of the partially clogged cells 2a and the area ratio of the protrusion(s) 5 in each partially clogged cell 2a may be set within the above numerical ranges, whereby the purifying performance as stated above can improve.

If the area ratio of the protrusion(s) 5 is less than 5%, this may fail to promote the diffusion of exhaust gas well and has difficulty to improve the purifying performance well. If the area ratio of the protrusion(s) 5 exceeds 80%, this inhibits the gas flow in the cells 2 and the purifying performance may deteriorate. The area ratio of protrusion(s) 5 is preferably 7 to 63%, and more preferably 12 to 60%. The average of the area ratio of protrusion(s) 5 in the partially clogged cell 2a is preferably 7 to 63%, and more preferably 12 to 60%.

If the ratio of number of the partially clogged cells 2a is less than 10%, the number of the partially clogged cells 2a is too small. Then the effect of improving purifying performance cannot be obtained well. If the ratio of number of the partially clogged cells 2a exceeds 80%, the number of the partially clogged cells 2a is too large. Then the purifying performance deteriorates.

If the thickness of the partition wall 1 surrounding the partially clogged cells 2a at the thinnest part is less than 0.038 mm, the mechanical strength of the honeycomb structure 100 deteriorates. The thickness of the partition wall 1 surrounding the partially clogged cells 2a is preferably 0.038 to 0.229 mm, and more preferably 0.064 to 0.132 mm.

In the honeycomb structure 100 of the present embodiment, the partition wall 1 surrounding the partially clogged cells 2a may have a dent (not shown) around the protrusion 5, the dent being an inwardly depressed part of the partition wall 1. This dent, for example, can cancel out (offset) the increasing volume of the partition wall 1 due to the protrusion(s) 5, and can suppress excessive increase of the volume of the honeycomb structure 100 as a whole. The heat capacity of the honeycomb structure 100 therefore can be similar to that of a conventional honeycomb structure without protrusions 5, and the honeycomb structure of the present invention does not have a disadvantage of degrading the light-off performance. Preferably the dent around the protrusion 5 has a complementary volume with the volume of the protrusion 5. For instance, a material of the partition wall 1, which should be present originally at the dent, is turned up to the inside of the partially clogged cell 2a preferably so as to define each protrusion 5.

The thickness of the partition wall 1 surrounding the partially clogged cell 2a at the thinnest part can be measured by the following method. Firstly an image of the honeycomb structure 100 is taken by Computed Tomography (CT). In this way, the honeycomb structure 100 as a whole is observed to specify a thinnest part of the partition wall 1. When the thickness of the thinnest part of the partition wall 1 can be measured based on the result of imaging, then the thickness is measured. If necessary, after specifying a thinnest part of the partition wall 1, the honeycomb structure 100 may be cut at a predetermined position, and the thickness of the partition wall 1 may be measured by an appropriate means, such as a microscope.

The length of the protrusion 5 in a direction extending from the first end face 11 to the second end face 12 is not limited especially. In one example, such a length of the protrusion 5 is preferably 0.21 to 1.36 mm, more preferably 0.30 to 0.80 mm, and particularly preferably 0.40 to 0.70 mm. Such a configuration can suppress excessive increase of the volume of the honeycomb structure 100 as a whole, and can reduce the disadvantage of degrading the light-off performance.

The partition wall 1 preferably has a thickness of 0.038 to 0.229 mm, more preferably 0.064 to 0.144 mm, and particularly preferably 0.069 to 0.132 mm. This configuration achieves sufficient mechanical strength of the honeycomb structure 100.

Preferably the cells 2 defined by the partition wall 1 have cell density that is 31 to 140 cells/cm$^2$, more preferably 47 to 116 cells/cm$^2$, and particularly preferably 62 to 93 cells/cm$^2$. The thus configured honeycomb structure 100 of the present embodiment can be favorably used as a member for purification (e.g., catalyst carrier) to purify exhaust gas emitted from an automobile engine.

Preferably the partition wall 1 has porosity of 25 to 55%, and more preferably 28 to 50%. The thus configured honeycomb structure can be favorably used as a catalyst carrier to be loaded with catalyst to purify exhaust gas. The porosity of the partition wall 1 is a value measured by mercury intrusion porosimetry. The porosity of the partition wall 1 can be measured using Autopore 9500 (product name) produced by Micromeritics Co, for example. To measure the porosity, a part of the partition wall 1 may be cut out from the honeycomb structure 100 to prepare a test piece for the measurement.

The shape of the cells 2 in the honeycomb structure body 4 is not limited especially. For instance, the cells 2 may have a polygonal shape, a circular shape, an elliptic shape, and the like in a cross section orthogonal to the extending direction of the cells 2. Examples of the polygonal shape include a triangle, a quadrangle, a pentagon, a hexagon, and an octagon. Preferably the shape of the cells 2 is a triangle, a quadrangle, a pentagon, a hexagon, and an octagon. For the shape of the cells 2, all of the cells 2 may have the same shape, or the cells 2 may have different shapes. For instance, although not shown, quadrangular cells and octagonal cells may be combined. For the size of the cells 2, all of the cells 2 may have the same size, or the cells 2 may have different sizes. For instance, although not shown, some of the plurality of cells may be larger, and other cells may be smaller relatively. The shape of the cells 2 as stated above does not include the shape of the protrusion(s) 5 protruding into the cells 2.

The circumferential wall 3 of the honeycomb structure body 4 may be monolithic with the partition wall 1 or may be a circumference coating layer that is formed by applying a circumference coating material so as to surround the partition wall 1. Although not shown, during the manufacturing process, the partition wall and the circumferential wall may be formed in a monolithic manner, and then the circumferential wall formed may be removed by a known method, such as grinding. Then, the circumference coating layer may be disposed at the circumference of the partition wall.

The shape of the honeycomb structure body 4 is not limited especially. Examples of the shape of the honeycomb structure body 4 include a pillar shape in which the first end face 11 and the second end face 12 have a shape, such as a circle, an ellipse, or a polygon.

The size of the honeycomb structure body 4, including the length from the first end face 11 to the second end face 12 and the size of a cross section orthogonal to the extending direction of the cells 2 of the honeycomb structure body 4, is not limited especially. The size may be selected appropriately so that the honeycomb structure 100 of the present embodiment can have the optimum ability for purification when it is used as a member to purify exhaust gas. For instance, the length from the first end face 11 to the second end face 12 of the honeycomb structure body 4 is preferably 76.2 to 228.6 mm, and more preferably 91.4 to 203.2 mm. The area of a cross section orthogonal to the extending direction of the cells 2 of the honeycomb structure body 4 is preferably 8107.3 to 99314.7 $mm^2$, and more preferably 16240.5 to 85633.6 $mm^2$.

Preferably the partition wall 1 is made of at least one type of materials selected from the group consisting of silicon carbide, cordierite, silicon-silicon carbide composite material, cordierite-silicon carbide composite material, silicon nitride, mullite, alumina, and aluminum titanate. The material of the partition wall 1 preferably includes the materials as stated above accounting for 30 mass % or more, more preferably 40 mass % or more, and particularly preferably 50 mass % or more. The silicon-silicon carbide composite material is a composite material including silicon carbide as the aggregate and silicon as the binder. The cordierite-silicon carbide composite material is a composite material including silicon carbide as the aggregate and cordierite as the binder. In the honeycomb structure 100 of the present embodiment, a particularly preferable material of the partition wall 1 is cordierite.

In the honeycomb structure 100 of the present embodiment, the partition wall 1 defining the plurality of cells 2 may be loaded with catalyst to purify exhaust gas. The partition wall 1 being loaded with catalyst refers to loading of the catalyst at the surface of the partition wall 1 or in the pores formed in the partition wall 1. More particularly, the honeycomb structure 100 of the present embodiment can increase the amount of catalyst to purify exhaust gas that is loaded in the pores of the partition wall 1, and so can suppress an increase of pressure loss after loading with the catalyst.

The loading amount of the catalyst loaded at the partition wall 1 of the honeycomb structure body 4 per unit volume may be determined appropriately depending on the type of the catalyst used. For instance, the honeycomb structure 100 of the present embodiment may have the filling rate of catalyst relative to the overall volume of the pores of the partition wall 1 that is 80% or more. As a method for loading the catalyst, catalyst slurry containing a catalyst component may be wash-coated on the honeycomb structure body 4, followed by heat treatment at high temperatures for burning, for example.

(2) Method for Manufacturing Honeycomb Structure:

A method for manufacturing the honeycomb structure of the present invention is not limited especially, and the honeycomb structure can be manufactured by the following method, for example. Firstly a kneaded material having plasticity is prepared to produce a honeycomb structure body. The kneaded material to produce a honeycomb structure body can be prepared by adding additives, such as binder and surfactant, pore former and water as needed to a material selected as raw material powder from the aforementioned materials suitable for the honeycomb structure body.

Preferably the kneaded material is prepared by adjusting the amount of water ingredients (e.g., the amount of water and surfactant) added to the kneaded material that is slightly less than that in a method for manufacturing a conventional honeycomb structure. This causes the shortage of viscosity of the kneaded material at the step of extrusion of the kneaded material as described later, which roughens the surface of the partition wall of the honeycomb formed body to have burrs. Then such burrs on the surface of the partition wall become protrusions protruding inward of the cells. The amount of water can be adjusted appropriately to control the size and the occurrence frequency of the protrusions.

The thus prepared kneaded material is extruded, thereby producing a pillar-shaped honeycomb formed body having a partition wall defining a plurality of cells and a circumferential wall surrounding this partition wall. The amount of water in the kneaded material can be adjusted as stated above to form desired protrusions on the surface of the partition wall.

The thus obtained honeycomb formed body is then dried by microwaves and hot air, for example. Next the honeycomb formed body is fired to manufacture a honeycomb structure. Temperatures and atmosphere for the firing differ according to the raw material, and those skilled in the art can select the temperature and atmosphere for the firing that are the most suitable for the selected material. In this way, the honeycomb structure of the present invention can be manufactured. The method for manufacturing the honeycomb structure of the present invention is not limited to the method as described above.

EXAMPLES

The following describes the present invention more specifically by way of examples, and the present invention is by no means limited to these examples.

Example 1

10 parts by mass of pore former, 1 part by mass of organic binder and 30 parts by mass of dispersing medium were added to 100 parts by mass of the cordierite forming raw material, followed by mixing and kneading to prepare a kneaded material. As the cordierite forming raw material, alumina, aluminum hydroxide, kaolin, talc, and silica were used. As the pore former, hollow resin particles were used. As the organic binder, methylcellulose was used. As the dispersing medium, water was used.

Next, the kneaded material was extruded using a die for manufacturing of a honeycomb formed body to have a honeycomb formed body having a round pillar shape as the overall shape. The cells of the honeycomb formed body had a quadrangular shape.

Next, this honeycomb formed body was dried by a microwave dryer, and then was dried completely by a hot-air drier, and then both end faces of the honeycomb formed body were cut so as to have predetermined dimensions. Next the dried honeycomb formed body was degreased and fired, so as to obtain a honeycomb structure of Example 1.

The honeycomb structure of Example 1 had a round pillar shape, where the first end face and the second end face were round. The first end face and the second end face had the diameter of 266.7 mm. The honeycomb structure had the length in the cell extending direction of 152.4 mm. The honeycomb structure of Example 1 had a thickness of the partition wall at a part other than the dents described later of 0.114 mm and the cell density of 62 cells/$cm^2$. The honeycomb structure had bulk density of 0.31 glee. Table 1 shows the results.

TABLE 1

| | Honeycomb structure | | Cell structure | | | | Partially clogged cells | | | Dents | | |
|---|---|---|---|---|---|---|---|---|---|---|---|---|
| | | | Partition wall thickness | | | | | Ratio of | | | | |
| | Diameter (mm) | Length (mm) | other than dents (mm) | thinnest part (mm) | Cell density (cells/cm²) | Bulk density (g/cc) | Area ratio of protrusions (ave.) (%) | number of partially clogged cells (%) | Length of protrusions (mm) | Depth (mm) | Width (mm) | Length (mm) |
| Ex. 1 | 266.7 | 152.4 | 0.114 | 0.084 | 62 | 0.31 | 5 | 10 | 0.21 | 0.030 | 0.300 | 0.50 |
| Ex. 2 | 266.7 | 152.4 | 0.114 | 0.084 | 62 | 0.31 | 12 | 30 | 0.30 | 0.030 | 0.300 | 1.0 |
| Ex. 3 | 266.7 | 152.4 | 0.114 | 0.083 | 62 | 0.31 | 7 | 20 | 0.50 | 0.031 | 0.400 | 1.2 |
| Ex. 4 | 266.7 | 152.4 | 0.114 | 0.084 | 62 | 0.31 | 60 | 60 | 0.30 | 0.030 | 0.350 | 1.0 |
| Ex. 5 | 266.7 | 152.4 | 0.114 | 0.084 | 62 | 0.31 | 70 | 13 | 0.80 | 0.030 | 0.450 | 2.3 |
| Ex. 6 | 266.7 | 152.4 | 0.114 | 0.084 | 62 | 0.31 | 63 | 70 | 0.80 | 0.030 | 0.450 | 2.3 |
| Ex. 7 | 266.7 | 152.4 | 0.114 | 0.082 | 62 | 0.31 | 80 | 10 | 1.36 | 0.032 | 0.800 | 2.5 |
| Ex. 8 | 266.7 | 152.4 | 0.114 | 0.074 | 62 | 0.31 | 75 | 80 | 0.40 | 0.040 | 0.300 | 1.0 |
| Ex. 9 | 266.7 | 152.4 | 0.114 | 0.038 | 62 | 0.31 | 40 | 50 | 0.70 | 0.076 | 0.500 | 3.0 |
| Comp. Ex. 1 | 266.7 | 152.4 | 0.114 | 0.114 | 62 | 0.31 | 0 | 0 | 0 | 0 | 0 | 0 |
| Comp. Ex. 2 | 266.7 | 152.4 | 0.114 | 0.109 | 62 | 0.31 | 2 | 10 | 0.1 | 0.005 | 0.200 | 0.4 |
| Comp. Ex. 3 | 266.7 | 152.4 | 0.114 | 0.104 | 62 | 0.31 | 85 | 11 | 1.4 | 0.010 | 0.900 | 3 |
| Comp. Ex. 4 | 266.7 | 152.4 | 0.114 | 0.109 | 62 | 0.31 | 5 | 5 | 0.2 | 0.005 | 0.300 | 1 |
| Comp. Ex. 5 | 266.7 | 152.4 | 0.114 | 0.074 | 62 | 0.31 | 84 | 85 | 0.8 | 0.040 | 0.300 | 1 |
| Comp. Ex. 6 | 266.7 | 152.4 | 0.114 | 0.032 | 62 | 0.31 | 30 | 35 | 1.4 | 0.082 | 1.160 | 1.0 |
| Comp. Ex. 7 | 266.7 | 152.4 | 0.114 | 0.000 | 62 | 0.31 | 20 | 32 | 1.5 | 0.114 | 1.160 | 1.5 |
| Comp. Ex. 8 | 266.7 | 152.4 | 0.114 | 0.114 | 62 | 0.47 | 0 | 0 | 152.4 | 0 | 0 | 0 |

The honeycomb structure of Example 1 had protrusions protruding inward of some of a plurality of cells from the surface of the partition wall. For such cells having protrusions protruding inward of the cells (partially clogged cells), the area ratio of the protrusions (%) and the ratio of number of the partially clogged cells (%) were obtained by the following method. The field of "Ratio of number of partially clogged cells (%)" in Table 1 shows the value of the ratio of the number of the partially clogged cells (%). For the obtained area ratios of protrusions in the partially clogged cells (%), their average was calculated. The field of "Area ratio of protrusions (ave.) (%)" in Table 1 shows the result.

(Area Ratio of Protrusions (%))

Images of the end face and a cross section of the honeycomb structure were analyzed by a microscope, and the area S0 of through channel including protrusions of the partially clogged cells and the area S1 of the protrusions were measured. Then the area S1 of the protrusions was divided by the area S0 of through channels, and 100 was multiplied by the resultant to obtain the "Area ratio of protrusions (%)". To check whether each cell had protrusions or not, the honeycomb structure was irradiated with light from the first end face, and light passing through the cells was observed at the second end face.

(Ratio of the Number of Partially Clogged Cells (%))

The total number of the cells in the honeycomb structure and the number of the partially clogged cells having the area ratio of protrusions (%) that was 5 to 80% were measured. Then, the number of the partially clogged cells was divided by the total number of the cells, and 100 was multiplied by the resultant to obtain "Ratio of the number of partially clogged cells (%)".

The honeycomb structure of Example 1 had dents around the protrusions, and the dents were inwardly depressed parts of the partition wall. The depth of these dents (mm), the length of the honeycomb structure from the first end face to the second end face (mm) and the width of the honeycomb structure in the direction orthogonal to the extending direction from the first end face to the second end face (mm) were measured by the following method. Table 1 shows the result. The depth (mm) of the dents, the length (mm) and the width (mm) in Table 1 were averages of these values.

(Depth (Mm) of Dents, Length (Mm) and Width (Mm))

Firstly an image of the honeycomb structure was taken by Computed Tomography (CT) to observe the honeycomb structure as a whole and specify a thinnest part of the partition wall. After specifying a thinnest part of the partition wall, the honeycomb structure was cut at the thinnest part of the partition wall. An image then was analyzed by a microscope to measure the depth of dents (mm), the length (mm) and the width (mm).

For the honeycomb structure of Example 1, the "NOx purifying ratio (%)", "isostatic strength (MPa)" and "compressive strength (MPa)" were measured by the following method. Table 2 shows the result.

TABLE 2

| | NOx purifying ratio (%) | Isostatic strength (MPa) | Compressive strength | | |
|---|---|---|---|---|---|
| | | | A-axis (MPa) | B-axis (MPa) | C-axis (MPa) |
| Ex. 1 | 60.4 | 4.0 | 14.0 | 4.2 | 0.14 |
| Ex. 2 | 63.5 | 4.0 | 13.7 | 4.3 | 0.15 |
| Ex. 3 | 63.0 | 4.0 | 13.7 | 4.2 | 0.15 |
| Ex. 4 | 65.0 | 4.0 | 13.7 | 4.3 | 0.15 |
| Ex. 5 | 62.1 | 4.0 | 13.8 | 4.3 | 0.15 |
| Ex. 6 | 63.4 | 4.0 | 13.8 | 4.3 | 0.15 |
| Ex. 7 | 61.0 | 4.0 | 13.9 | 4.2 | 0.14 |
| Ex. 8 | 61.8 | 4.0 | 13.8 | 4.2 | 0.14 |
| Ex. 9 | 64.5 | 3.5 | 11.0 | 3.5 | 0.10 |
| Comp. Ex. 1 | 58.0 | 4.0 | 13.7 | 4.2 | 0.14 |
| Comp. Ex. 2 | 58.0 | 4.0 | 13.8 | 4.2 | 0.16 |
| Comp. Ex. 3 | 56.0 | 3.5 | 14.2 | 4.2 | 0.15 |
| Comp. Ex. 4 | 58.0 | 4.0 | 13.9 | 4.1 | 0.14 |
| Comp. Ex. 5 | 54.0 | 4.0 | 13.8 | 4.2 | 0.14 |
| Comp. Ex. 6 | 63.9 | 1.0 | 2.5 | 1.3 | 0.05 |
| Comp. Ex. 7 | 63.5 | 0.5 | 2.2 | 1.0 | 0.03 |
| Comp. Ex. 8 | 60.0 | 3.0 | 12.3 | 2.2 | 0.08 |

(NOx Purifying Ratio (%))

Copper zeolite catalyst was loaded at the honeycomb structure by absorbing the catalyst into the honeycomb structure using difference in pressure to prepare a honeycomb catalyst body. Test gas containing NOx was allowed to flow through the prepared honeycomb catalyst body, and then the amount of NOx in exhaust gas emitted from the honeycomb catalyst body was measured by gas analyzer (produced by HORIBA, Ltd., MEXA9100EGR (product name)). Then the NOx purifying ratio was calculated from the amount of NOx in test gas and the amount of NOx in the exhaust gas. The temperature of the test gas flowing through the honeycomb catalyst carrier was 200° C. The temperatures of the honeycomb catalyst body and the test gas were adjusted by a heater. For the heater, an infrared image furnace was used. For the test gas, 5 volume % of carbon dioxide, 14 volume % of oxygen, 350 ppm of nitric monoxide (volumetric basis), 350 ppm of ammonia (volumetric basis), and 10 volume % of water were mixed with nitrogen. To prepare this test gas, water and the mixture gas of gases other than water were separately prepared, and they were mixed in a tube before the test. The space velocity of the test gas flowing into the honeycomb catalyst body was 100,000 (hour$^{-1}$). "NOx purifying ratio (%)" was the value obtained by subtracting the amount of NOx in the gas emitted from the honeycomb catalyst body from the amount of NOx in the test gas, dividing the resultant by the amount of NOx in the test gas and multiplying the result by 100 (unit: %).

(Isostatic Strength (MPa))

Isostatic strength was measured in accordance with the isostatic fracture strength testing specified at M505-87 of the Japanese Automotive Standards Organization (JASO) that is a specification issued by the Society of Automotive Engineers of Japan. Isostatic fracture strength is tested by placing a honeycomb structure in a rubber-made tubular container, which is sealed with an aluminum plate, and applying an isostatic pressure thereto in water. Isostatic strength measured by this isostatic fracture strength testing is indicated as a pressure (MPa) applied when the honeycomb structure breaks down.

(Compressive Strength (MPa))

To measure the compressive strength, a test piece to measure compressive strength was prepared by hollowing the test piece out of the honeycomb structure, and the fracture strength of the test piece was measured when compressive load was applied to A-axis, B-axis and C-axis of the test piece. The A-axis refers to the direction from the first end face to the second end face of the pillar-shaped honeycomb structure. The B-axis refers to the direction perpendicular to the A-axis and the surface of the partition wall surrounding the cells. The C-axis refers to the 45° direction relative to the B-axis.

Examples 2 to 9, Comparative Examples 1 to 8

The honeycomb structures of these Examples and Comparative Examples were manufactured similarly to Example 1 other than that the configuration of these honeycomb structures was changed as shown in Table 1. The area ratio of protrusions and the ratio of number of partially clogged cells were adjusted by changing the amount of water to prepare the kneaded material variously within in the range of 65 parts by mass or less so as to change the state of formation of the surface of the partition wall of each of the honeycomb formed bodies during extrusion.

For the honeycomb structures of Examples 2 to 9 and Comparative Examples 1 to 8, the "NOx purifying ratio (%)", "isostatic strength (MPa)" and "compressive strength (MPa)" were measured similarly to Example 1. Table 2 shows the result.

(Results)

The honeycomb structures of Examples 1 to 9 successively improved the NOx purifying performance as compared with the honeycomb structure of Comparative Example 1. The honeycomb structures of Examples 1 to 9 had the isostatic strength at the accepted level. Considering the effect of improving the purifying performance, a sufficient effect of suppressing a decrease in strength was confirmed for these Examples.

The honeycomb structure of Comparative Example 2 had the area ratio of protrusions of 2%, and the NOx purifying performance was not improved.

The honeycomb structure of Comparative Example 3 had the area ratio of protrusions of 85%, and the NOx purifying performance decreased.

The honeycomb structure of Comparative Example 4 had the ratio of the number of partially clogged cells of 5%, and the NOx purifying performance was not improved.

The honeycomb structure of Comparative Example 5 had the ratio of the number of partially clogged cells of 85%, and the NOx purifying performance decreased.

The honeycomb structure of Comparative Example 6 had the thickness of the partition wall at a thinnest part of 0.032 mm, and the isostatic strength and the compressive strength decreased.

The honeycomb structure of Comparative Example 7 missed a part of the partition wall, and the isostatic strength and the compressive strength remarkably decreased.

The honeycomb structure of Comparative Example 8 included a protrusion continuously formed over the entire length in the cell extending direction. That is, the honeycomb structure of Comparative Example 8 had a protrusion over the entire area of the partially clogged cell in the cell-extending direction. This honeycomb structures of Comparative Example 8 had increased bulk density, and so the NOx purifying performance was degraded.

The honeycomb structure of the present invention can be used for a catalyst carrier to be loaded with catalyst to purify exhaust gas.

DESCRIPTION OF REFERENCE NUMERALS

1: partition wall, 2: cell, 2a: partially clogged cell, 3: circumferential wall, 4: honeycomb structure body, 5: protrusion, 11: first end face, 12: second end face, 100: honeycomb structure, S0: area of through channel (area of through channel of partially clogged cell, the area including protrusion), S1: area (area of protrusion)

What is claimed is:

1. A honeycomb structure comprising:
    a pillar-shaped honeycomb structure body having a first end face and a second end face and including a porous partition wall disposed so as to surround a plurality of cells, the plurality of cells extending from the first end face to the second end face and serving as a through channel of fluid,
    wherein the plurality of cells include partially clogged cells that account for 10 to 80% of the total number of the plurality of cells, each of the partially clogged cells including a protrusion that protrudes inward of each of the partially clogged cells from the surface of the partition wall that surrounds each of the partially clogged cells, the protrusion in each of the partially clogged cells is partially formed in a direction in which each of the partially clogged cells extends, in a projected view from the first end face to the second end face of the honeycomb structure body, a ratio of area of the protrusion in each of the partially clogged cells to whole area of the through channel of the partially clogged cells is 5 to 80%, the whole area including the protrusion, the partition wall surrounding each of the partially clogged cells has a thickness at a thinnest part of 0.038 mm or more, and the partition wall surrounding each of the partially clogged cells has a dent around the protrusion, the dent being an inwardly depressed part of the partition wall.

2. The honeycomb structure according to claim 1, wherein the partition wall has a thickness of 0.038 to 0.229 mm.

3. The honeycomb structure according to claim 2, wherein the protrusion has a length in a direction extending from the first end face to the second end face that is 0.21 to 1.36 mm.

4. The honeycomb structure according to claim 3, wherein the honeycomb structure body has cell density of 31 to 140 cells/cm$^2$.

5. The honeycomb structure according to claim 2, wherein the honeycomb structure body has cell density of 31 to 140 cells/cm$^2$.

6. The honeycomb structure according to claim 1, wherein the protrusion has a length in a direction extending from the first end face to the second end face that is 0.21 to 1.36 mm.

7. The honeycomb structure according to claim 6, wherein the honeycomb structure body has cell density of 31 to 140 cells/cm$^2$.

8. The honeycomb structure according to claim 1, wherein the honeycomb structure body has cell density of 31 to 140 cells/cm$^2$.

\* \* \* \* \*